(12) United States Patent
Kuhlman et al.

(10) Patent No.: US 11,028,191 B2
(45) Date of Patent: Jun. 8, 2021

(54) POLYMERIZATION CATALYSTS WITH IMPROVED ETHYLENE ENCHAINMENT

(71) Applicant: Univation Technologies, LLC, Houston, TX (US)

(72) Inventors: Roger L. Kuhlman, Freeport, TX (US); Mahsa McDougal, Freeport, TX (US); Timothy M. Boller, Houston, TX (US); C. Jeff Harlan, Houston, TX (US); Timothy R. Lynn, Middlesex, NJ (US); Cliff R. Mure, Middlesex, NJ (US); John F. Szul, S. Charleston, WV (US); Daniel P. Zilker, Jr., Easton, PA (US)

(73) Assignee: Univation Technologies, LLC, Midland, MI (US)

( * ) Notice: Subject to any disclaimer, the term of this patent is extended or adjusted under 35 U.S.C. 154(b) by 26 days.

(21) Appl. No.: 16/337,725

(22) PCT Filed: Sep. 26, 2017

(86) PCT No.: PCT/US2017/053451
§ 371 (c)(1),
(2) Date: Mar. 28, 2019

(87) PCT Pub. No.: WO2018/064044
PCT Pub. Date: Apr. 5, 2018

(65) Prior Publication Data
US 2020/0031958 A1 Jan. 30, 2020

Related U.S. Application Data

(60) Provisional application No. 62/402,699, filed on Sep. 30, 2016.

(51) Int. Cl.
*C08F 4/44* (2006.01)
*C08F 4/6592* (2006.01)
*B01J 31/22* (2006.01)
*C08F 210/14* (2006.01)
*C08F 210/16* (2006.01)
*C08F 4/642* (2006.01)

(52) U.S. Cl.
CPC ....... *C08F 4/65925* (2013.01); *B01J 31/2295* (2013.01); *C08F 210/14* (2013.01); *C08F 210/16* (2013.01); *B01J 2231/122* (2013.01); *B01J 2531/46* (2013.01); *B01J 2531/48* (2013.01); *B01J 2531/49* (2013.01); *C08F 4/6428* (2013.01)

(58) Field of Classification Search
None
See application file for complete search history.

(56) References Cited

U.S. PATENT DOCUMENTS

| 5,525,678 | A | 6/1996 | Mink et al. |
|---|---|---|---|
| 2004/0249096 | A1 | 12/2004 | McCullough |
| 2012/0142874 | A1 | 6/2012 | Fantinel et al. |
| 2014/0288249 | A1 | 9/2014 | Sun et al. |
| 2015/0225497 | A1 | 8/2015 | Kim et al. |
| 2016/0032025 | A1 | 2/2016 | Giesbrecht |

OTHER PUBLICATIONS

International Preliminary Report on Patentability for related PCT Application PCT/US2017/053451, dated Apr. 11, 2019 (9 pgs).
International Search Report & Written Opinion for related PCT Application PCT/US2017/053451, dated Apr. 16, 2018 (15 pgs).

*Primary Examiner* — Yun Qian
(74) *Attorney, Agent, or Firm* — Brooks, Cameron & Huebsch, PLLC

(57) ABSTRACT

Embodiments of the present disclosure directed towards polymerization catalysts having improved ethylene enchainment. As an example, the present disclosure provides a polymerization catalyst having improved ethylene enchainment, the polymerization catalyst comprising a zirconocene catalyst of Formula (I) where $R_1$ is a $C_1$ to $C_{20}$ alkyl, aryl or aralkyl group, wherein $R_2$ is an $C_1$ to $C_{20}$ alkyl, aryl or aralkyl group, and where $R_3$ is a $C_1$ to $C_{20}$ alkyl or a hydrogen, and where each X is independently a halide, $C_1$ to $C_{20}$ alkyl, aralkyl group or hydrogen.

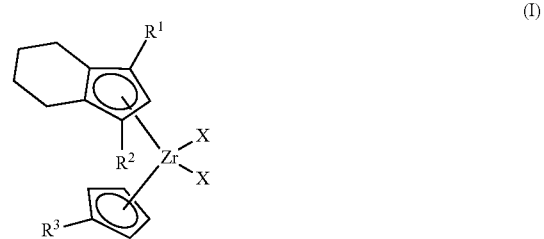

(I)

8 Claims, 1 Drawing Sheet

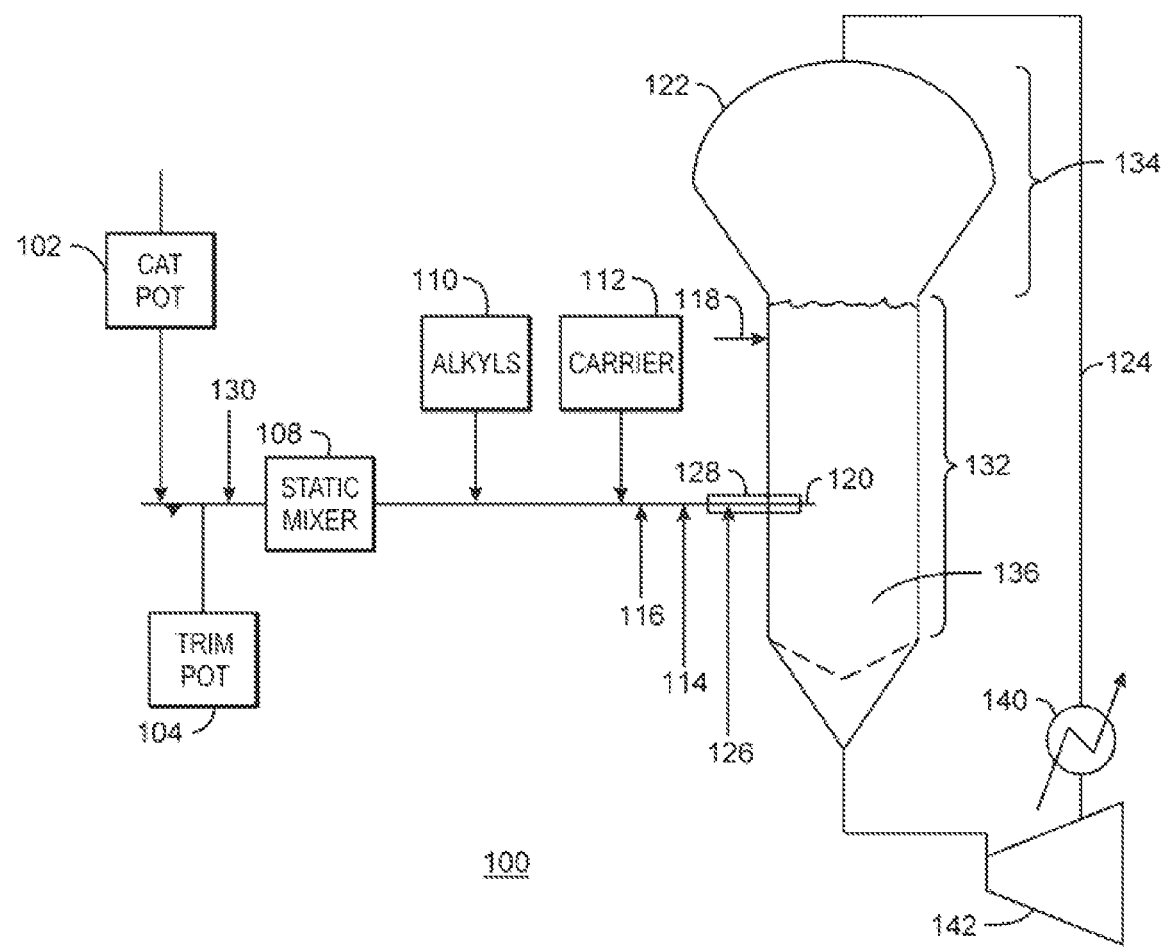

POLYMERIZATION CATALYSTS WITH IMPROVED ETHYLENE ENCHAINMENT

This application is a National Stage Application under 35 U.S.C. § 371 of International Application Number PCT/US2017/053451, filed Sep. 26, 2017 and published as WO 2018/064044 on Apr. 5, 2018, which claims the benefit to U.S. Provisional Application 62/402,699, filed Sep. 30, 2016, the entire contents of which are incorporated herein by reference in its entirety.

FIELD OF DISCLOSURE

Embodiments of the present disclosure are directed towards polymerization catalysts with improved ethylene enchainment, more specifically, embodiments are directed towards bimodal polymerization catalysts that can be utilized to form bimodal polymers with improved ethylene enchainment.

BACKGROUND

Polymers may be utilized for a number of products including films and pipes, among other. Polymers can be formed by reacting one or more types of monomer in a polymerization reaction. There is continued focus in the industry on developing new and improved materials and/or processes that may be utilized to form polymers.

Ethylene alpha-olefin (polyethylene) copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

A number of catalyst compositions containing single site catalysts, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites. Single site catalysts may produce polyethylene copolymers that have a narrow molecular weight distribution. Although there are single site catalysts that can produce broader molecular weight distributions, polymers produced by these catalysts often show a narrowing of the molecular weight distribution (MWD) as the reaction temperature is increased, for example, to increase production rates. Further, a single site catalyst will often incorporate an amount of comonomer into the molecules of the polyethylene copolymer.

It is generally known in the art that a polyolefin's MWD affects different product attributes. Polymers having a broad molecular weight distribution may have improved physical and/or mechanical properties, such as stiffness, toughness, processibility, and environmental stress crack resistance (ESCR), among others.

To achieve these properties, bimodal polymers have become increasingly important in the polyolefin industry, with a variety of manufacturers offering products of this type. Bimodal polymers generally refer to polymers produced using two or more different catalyst types or two or more different reactor environments, such that the resultant polymers have a bimodal molecular weight distribution typically including a low molecular weight component and a high molecular weight component (having a comparatively high molecular weight and/or range of molecular weights than the low molecular weight component). Whereas older technology relied on two-reactor systems to generate such material, advances in catalyst design and supporting technology have allowed for the development of single reactor bimetallic catalyst systems capable of producing bimodal high density polyethylene (HDPE). These systems are attractive both from a cost perspective and ease of use.

Control of these properties is obtained for the most part by the choice of the catalyst system. Thus, the catalyst design is important for producing polymers that are attractive from a commercial standpoint. There exists a need for controlled techniques for forming polyethylene polymers having a desirable molecular weight from a catalyst having a desirable degree of ethylene enchainment (i.e., ethylene selectivity) and yet that retains a desired degree of polymerization activity.

BRIEF DESCRIPTION OF DRAWINGS

FIG. 1 is a schematic of a gas-phase reactor system, showing an example of an expected addition of a bimodal polymerization catalyst system that includes a non-metallocene olefin polymerization catalyst and a zirconocene catalyst of Formula I, in accordance with embodiments described herein.

SUMMARY

As mentioned, there exists a need for controlled techniques for forming polyethylene polymers having a desirable molecular weight from a catalyst having a desirable degree of ethylene enchainment (i.e., ethylene selectivity) and yet that retains a desired degree of polymerization activity.

Further, bimodal polymers have become increasingly important in the polyolefin industry, with a variety of manufacturers offering products of this type. Whereas older technology relied on two-reactor systems to generate such material, advances in catalyst design and supporting technology have allowed for the development of single reactor bimetallic catalyst systems capable of producing bimodal high density polyethylene (HDPE). These systems are attractive both from a cost perspective and ease of use.

For example, a catalyst may be one part of a multiple-catalyst system operated in a single reactor environment. In such multiple-catalyst systems, it may be furthermore desired that one catalyst produces polyethylene of low comonomer content. For instance, a low molecular weight component of a bimodal polyethylene may desirably have a lower comonomer content. Thus, the catalyst may have a high degree of ethylene enchainment to generate a polymer component with low comonomer content. For instance, metallocene catalysts employed for high ethylene enchainment frequently have several substituents on one or both cyclopentadienyl ligands (i.e., near the metal center), intended to sterically block the approach of comonomer to the catalyst metal center. However, such steric bulk near the metal center may also lead to lower than desired catalyst productivities, which may undesirably increase production costs. For example, the metallocene (n-PrCp)(Me$_4$Cp)ZrCl$_2$ may exhibit high ethylene enchainment, but have lower catalyst productivity than some other metallocenes with less cyclopentadienyl substitution. Thus, there remains an unmet need in the industry for catalysts that provide a high degree of ethylene selectivity yet retain a high polymerization activity.

Accordingly, the present disclosure provides a polymerization catalyst of Formula I:

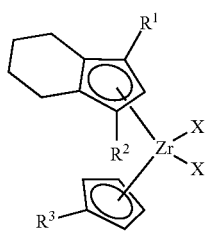

(Formula I)

where $R_1$ is a $C_1$ to $C_{20}$ alkyl, aryl or aralkyl group, where $R_2$ is a $C_1$ to $C_{20}$ alkyl, aryl or aralkyl group, and where $R_3$ is a $C_1$ to $C_{20}$ alkyl or a hydrogen, and where each X is independently a halide, $C_1$ to $C_{20}$ alkyl, aralkyl or hydrogen.

Further, the present disclosure provides bimodal polyethylene compositions including a high molecular weight polyethylene component and a low molecular weight polyethylene component having improved ethylene enchainment formed in a single reactor via a bimodal polymerization catalyst comprising a non-metallocene catalyst and a zirconocene catalyst of the Formula I, as described above Furthermore, the present disclosure provides methods of producing polyethylene, the methods including polymerizing ethylene in a reactor in presence of a bimodal polymerization catalyst system to form the polyethylene, where the bimodal polymerization catalyst system includes a non-metallocene catalyst and a zirconocene catalyst of Formula I, as described above.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polymerization catalysts with improved ethylene enchainment, bimodal polyethylene compositions formed via bimodal polymerization catalyst systems with improved ethylene enchainment, and methods of producing polyethylene employing bimodal polymerization catalyst systems with improved ethylene enchainment are described herein. Polymerization catalysts and bimodal polymerization catalyst systems include a new zirconocene catalyst of Formula I, as described herein. In general, the present techniques are directed to the new zirconocene catalyst of Formula I that improves polymerization economics and gives desirable polymer properties. For instance, the polymerization catalysts having including the new zirconocene of Formula I can be employed in a single reactor to form a polyethylene having desirable properties such as having improved ethylene enchainment (e.g., as evidenced by a lower butyl branching frequency).

Similarly, bimodal polymerization catalyst systems including the new zirconocene catalyst of Formula I can be employed in a single reactor to form bimodal polyethylene compositions having desirable properties such as a desirable (e.g., broad) molecular weight distribution and/or having improved ethylene enchainment. Further, in such bimodal catalyst systems a desired distribution of comonomer between a high molecular weight polyethylene component and a low molecular weight polyethylene component of a bimodal polyethylene composition can be achieved.

In various embodiments, a zirconocene catalyst of Formula I may be selected to produce a low molecular weight component, as described herein. Of course, other metallocene catalysts, as described herein, may be employed in addition to the zirconocene catalyst of Formula I. A non-metallocene, as described herein, may be selected to produce a higher molecular weight component, as described herein.

In various embodiments herein a high molecular weight polyethylene component comprises a polyethylene that comprises a comonomer being butene, propene, hexene, octene, and mixtures thereof, where the comonomer is expected to be present in an amount from 0.5 weight percent (wt. %) of the polyethylene to 6.0 wt. % of the polyethylene. In various embodiments herein a low molecular weight polyethylene component comprises a polyethylene that comprises a comonomer being butene, propene, hexene, octene, and mixtures thereof, where the comonomer is expected to be present in an amount from 0.2 wt. % of the polyethylene to 4.0 wt. % of the polyethylene.

The expected ratio of the $M_w$ for a low molecular weight component and a high molecular weight component can be between 1:5 and 1:50, or about 1:10 and 1:40. Notably, in various embodiments herein a ratio of the weight percent comonomer of the low molecular weight polyethylene component to the weight percent comonomer of the high molecular weight polyethylene component is expected to be from 1.4 to 10, in contrast to other approaches that have comparatively high amounts of comonomer on copolymer of a low molecular weight polyethylene component relative to comparatively low amounts of comonomer on a high molecular weight polyethylene component of a bimodal polymer. As for properties of HDPE resin for pipe applications, for example, the new zirconocene catalyst is expected to have similar HDPE properties as compared to a reference metallocene catalyst but with the HDPE being expected to have a desirable (e.g., broad) molecular weight distribution and/or being expected to have a desired distribution of comonomer between a high molecular weight polyethylene component and a low molecular weight polyethylene component of a bimodal polyethylene composition.

Catalyst Compounds

Zirconocene Catalyst Compounds

Zirconocene catalysts are a type of a metallocene catalyst. Metallocene catalyst compounds can include "half sandwich" and/or "full sandwich" compounds having one or more Cp ligands (e.g., cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

As mentioned, the polymerization catalyst comprises a zirconocene catalyst with improved ethylene enchainment of the Formula I:

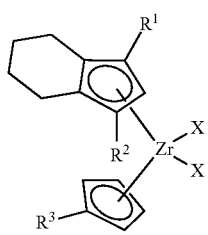

(Formula I)

wherein R$_1$ is a C$_1$ to C$_{20}$ alkyl, aryl or aralkyl group, wherein R$_2$ is an C$_1$ to C$_{20}$ alkyl, aryl or aralkyl group, and wherein R$_3$ is a C$_1$ to C$_{20}$ alkyl or a hydrogen, and where each X is independently a halide, C$_1$ to C$_{20}$ alkyl, aralkyl group or hydrogen. Stated differently, each of R$^1$, R$^2$, R$^3$, and R$^4$, are independently a C$_1$ to C$_{20}$ alkyl, a C$_6$ to C$_{20}$ aryl or C$_7$ to C$_{20}$ aralkyl group or a hydrogen.

As used herein, the phrase "catalyst system" or "bimodal catalyst system" includes at least one "catalyst component" and at least one "activator", both of which are described further herein. The catalyst system may also include other components, such as supports, etc., and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins.

As used herein, the phrase "leaving group" refers to one or more chemical moieties bound to the metal center of the catalyst component that can be abstracted from the catalyst component by an activator, thus producing the species active towards olefin polymerization or oligomerization.

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —CH3 group ("methyl") and a CH3CH2- group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups include phenyl, naphthyl, pyridyl and other radicals whose molecules have the ring structure characteristic of benzene, naphthylene, phenanthrene, anthracene, etc. It is understood that an "aryl' group can be a C$_6$ to C$_{20}$ aryl group. For example, a C$_6$H$_5$$^-$ aromatic structure is a "phenyl", a C$_6$H$_4$$^{2-}$ aromatic structure is an "phenylene". An "arylalkyl" group is an alkyl group having an aryl group pendant therefrom. It is understood that an "aralkyl" group can be a C$_7$ to C$_{20}$ aralkyl group. An "alkylaryl" is an aryl group having one or more alkyl groups pendant therefrom.

As used herein, an "alkylene" includes linear, branched and cyclic hydrocarbon radicals deficient by two hydrogens. Thus, —CH$_2$— ("methylene") and —CH$_2$CH$_2$— ("ethylene") are examples of alkylene groups, Other groups deficient by two hydrogen radicals include "arylene" and "alkenylene".

As used herein, the phrase "heteroatom" includes any atom other than carbon and hydrogen that can be bound to carbon, and in one embodiment is selected from the group consisting of B, Al, Si, Ge, N, P, O, and S. A "heteroatom-containing group" is a hydrocarbon radical that contains a heteroatom and may contain one or more of the same or different heteroatoms, and from 1 to 3 heteroatoms in a particular embodiment. Non-limiting examples of heteroatom-containing groups include radicals of imines, amines, oxides, phosphines, ethers, ketones, oxoazolines heterocyclics, oxazolines, thioethers, and the like.

As used herein, an "alkylcarboxylate", "arylcarboxylate", and "alkylarylcarboxylate" is an alkyl, aryl, and alkylaryl, respectively, that possesses a carboxyl group in any position. Examples include C$_6$H$_5$CH$_2$C(O)O$^-$, CH$_3$C(O)O$^-$, etc.

As used herein, an aralkyl group is defined to be a substituted aryl group.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

In various embodiments, $R_2$ can be a $C_1$ to $C_{20}$ alkyl. For instance, in some embodiments, $R_2$ can be a $C_1$ alkyl, among other possibilities. For example, the polymerization catalyst of Formula I can comprise a zirconocene catalyst of:

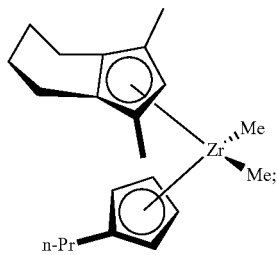

(Formula II)

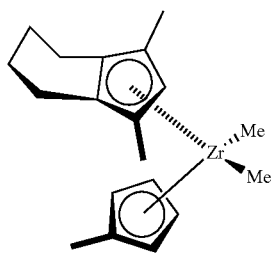

(Formula III)

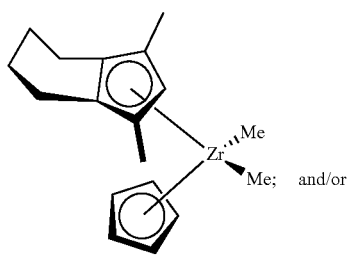

(Formula IV)

and/or

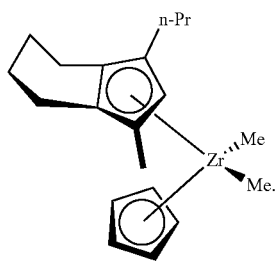

(Formula V)

That is, in various embodiments, the polymerization catalyst of Formula I can comprise a polymerization catalyst of the Formula II, Formula III, Formula IV, Formula V or a combination thereof. However, the disclosure is not so limited. Rather, various components of Formula II, Formula III, Formula IV, and/or Formula V, can be added, removed, and/or altered. For example, while Formula II, Formula III, Formula IV, and Formula V each illustrate X as being a C1 alkyl (i.e., methyl) it is understood that X can be varied, for instance, be a halide, another alkyl group, an aryl group, an aralkyl group and/or a hydrogen, among other possibilities.

An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In some embodiments, $R_1$ of Formula I can be a $R_2$ can be a $C_1$ to $C_{20}$ alkyl. For instance, $R_1$ can be a $C_1$ alkyl, among other possibilities. In some embodiments, $R_1$ of Formula I can be $C_3$ alkyl such as a linear $C_3$ alkyl.

In some embodiments, $R_3$ can be $C_1$ to $C_{20}$ alkyl. For instance, $R_3$ can be $C_3$ alkyl such as a linear $C_3$ alkyl, among other possibilities. In some embodiments $R_3$ can be an $C_1$ alkyl or a hydrogen.

As mentioned, in various embodiments, the polymerization catalyst of Formula I can be included in a bimodal polymerization catalyst system further including a non-metallocene catalyst.

Non-Metallocene Catalyst Compounds

The non-metallocene catalyst may be a Group 15 metal-containing catalyst compound. That is, the bimodal polymerization catalyst systems described herein can include one or more Group 15 metal-containing catalyst compounds. As used herein, these are termed non-metallocene catalyst compounds. The Group 15 metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a C1 to C20 hydrocarbon group, a heteroatom containing group, silicon, germanium, tin, lead, or phosphorus, where the Group 15 or 16 atom may also be bound to nothing or a hydrogen, a Group 14 atom containing group, a halogen, or a heteroatom containing group, and where each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with structures (IX) or (X):

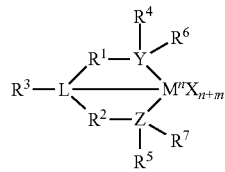

(IX)

-continued

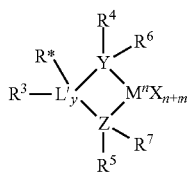
(X)

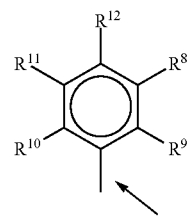
(XI)

Bond to Z or Y where M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a linear, branched or cyclic $C_2$ to $C_{20}$ alkyl group, or a $C_2$ to $C_6$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that R1 and R2 may be directly bound to each other or may be bound to each other through other groups. By "R4 and R5 may also be interconnected" it is meant that R4 and R5 may be directly bound to each other or may be bound to each other through other groups.

In one or more embodiments, R4 and R5 are independently a group represented by the following structure (XI).

when $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following structure (XII).

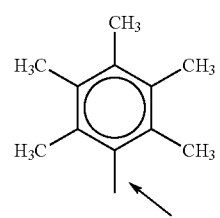
(XII)

Bond to Z or Y

When $R^4$ and $R^5$ follow structure (XII), M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

Catalyst Forms

Any number of combinations of catalyst components may be used in embodiments. The unimodal polymerization catalyst may include a catalyst component of Formula I in a slurry. The slurry may include an activator or a support and no initial catalyst. In this case, one or more solution catalysts may be added to the slurry to cause the catalyst to be supported.

The bimodal polymerization catalyst system may include a catalyst component in a slurry, which may have an initial catalyst compound, and an added solution catalyst component that is added to the slurry. Generally, a non-metallocene catalyst will be supported in the initial slurry, depending on solubility. However, in some embodiments, the initial catalyst component slurry may have no catalysts but may have an activator or support. In this case, two or more solution catalysts may be added to the slurry to cause each to be supported.

As mentioned, any number of combinations of catalyst components may be used in embodiments. For example, the catalyst component slurry can include an activator and a support, or a supported activator. Further, the slurry can include a catalyst compound in addition to the activator and the support. As noted, the catalyst compound in the slurry may be supported.

The slurry may include one or more activators and supports, and one more catalyst compounds. For example, the slurry may include two or more activators (such as alumoxane and a modified alumoxane) and a catalyst compound, or the slurry may include a supported activator and more than one catalyst compounds. In one embodiment, the slurry includes a support, an activator, and two catalyst compounds. In another embodiment the slurry includes a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, or 150:1 to 1:1. The slurry can include a support material which may be any inert particulate carrier material known in the art, including, but not limited to, silica, fumed silica, alumina, clay, talc or other support materials such as disclosed above. In one embodiment, the slurry contains silica and an activator, such as methyl aluminoxane ("MAO"), modified methyl aluminoxane ("MMAO"), as discussed further below.

One or more diluents or carriers can be used to facilitate the combination of any two or more components of the catalyst system in the slurry or in the trim catalyst solution. For example, the single site catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst mixture or the catalyst/activator mixture can be added to the support.

The catalyst is not limited to a slurry arrangement, as a catalyst system may be made on a support and dried. The dried catalyst system can then be fed to the reactor through a dry feed system.

Support

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. The single site catalyst compounds of the slurry can be spray dried. The support used with the single site catalyst compound can be functionalized, or at least one substituent or leaving group is selected.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include silica, alumina, or a combination thereof. In one embodiment described herein, the support is silica.

Commercially available silica supports can include, but are not limited to, ES757, ES70, and ES70W available from PQ Corporation. Suitable commercially available silica-alumina supports can include, but are not limited to, SIRAL® 1, SIRAL® 5, SIRAL® 10, SIRAL® 20, SIRAL® 28M, SIRAL® 30, and SIRAL® 40, available from SASOL®. Generally, catalysts supports comprising silica gels with activators, such as methylaluminoxanes (MAOs), are used in the trim systems described, since these supports may function better for cosupporting solution carried catalysts. Other catalyst supports are applicable. In various embodiments, the non-metallocene catalyst and the zirconocene catalyst may be co-supported on a single support Activator As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst".

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O— subunits, where R is an alkyl group. Examples of aluminoxanes include, but are not limited to MAO, MMAO, ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Catalyst Component Solution

The catalyst component solution may include only a catalyst compound, such as a zirconocene, or may include an activator in addition to the catalyst compound. The catalyst solution used in the trim process can be prepared by dissolving the catalyst compound and optional activators in a liquid solvent. The liquid solvent may be an alkane, such as a C5 to C30 alkane, or a C5 to C10 alkane. Cyclic alkanes such as cyclohexane and aromatic compounds such as toluene may also be used. In addition, mineral oil may be used as a solvent. The solution employed should be liquid under the feed conditions to the polymerization reactor, and relatively inert. In one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to about 90 wt. %, at up to about 50 wt. %, at up to about 20 wt. %, up to about 10 wt. %, at up to about 5 wt. %, at less than 1 wt. %, or between 100 ppm and 1 wt. %, based upon the weight of the solvent and the activator or catalyst compound.

The catalyst component solution can comprise any one of the soluble catalyst compounds described in the catalyst section herein. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

The aforementioned control agents and other control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula: —($CH_2$—$CH_2$—NH)$_n$—, in which n may be from about 10 to about 10,000. The polyethyleneimines may be linear, branched, or hyperbranched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —[CH2-CH2-NH]— may be used as the polyethyleneimine, materials having primary, secondary, and tertiary branches can also be used. Commercial polyethyleneimine can be a compound having branches of the ethyleneimine polymer.

Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF.

Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %. Other static control agents and additives are applicable.

The continuity additive(s) or static control agent(s) may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

Gas Phase Polymerization Reactor

FIG. 1 is a schematic of a gas-phase reactor system, showing the addition of a bimodal polymerization catalyst system that includes a non-metallocene catalyst and a zirconocene catalyst. The catalyst component slurry such as those of preferably a mineral oil slurry including at least one support and at least one activator, at least one supported activator, and optional catalyst compounds may be placed in a vessel or catalyst pot (cat pot) 202. In one embodiment, the cat pot 102 is an agitated holding tank designed to keep the solids concentration homogenous. A catalyst component solution, prepared by mixing a solvent and at least one catalyst compound (e.g., non-metallocene catalyst and/or zirconocene catalyst) and/or activator, is placed in another vessel, which can be termed a trim pot 104. The catalyst component slurry can then be combined in-line with the catalyst component solution to form a final catalyst composition. A nucleating agent such as silica, alumina, fumed silica or any other particulate matter may be added to the slurry and/or the solution in-line or in the vessels 102 or 104. Similarly, additional activators or catalyst compounds may be added in-line. For example, a second catalyst slurry that includes a different catalyst may be introduced from a second cat pot. The two catalyst slurries may be used as the catalyst system with or without the addition of a solution catalyst from the trim pot.

The catalyst component slurry and solution can be mixed in-line. For example, the solution and slurry may be mixed by utilizing a static mixer 108 or an agitating vessel (not shown). The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 1 to about 60 minutes, about 5 to about 40 minutes, or about 10 to about 30 minutes.

In an embodiment, an aluminum alkyl, an ethoxylated aluminum alkyl, an aluminoxane, an anti-static agent or a borate activator, such as a C1 to C15 alkyl aluminum (for example tri-isobutyl aluminum, trimethyl aluminum or the like), a C1 to C15 ethoxylated alkyl aluminum or methyl aluminoxane, ethyl aluminoxane, isobutylaluminoxane, modified aluminoxane or the like are added to the mixture of the slurry and the solution in line. The alkyls, antistatic agents, borate activators and/or aluminoxanes may be added from an alkyl vessel 110 directly to the combination of the solution and the slurry, or may be added via an additional alkane (such as isopentane, hexane, heptane, and or octane) carrier stream, for example, from a hydrocarbon vessel 112. The additional alkyls, antistatic agents, borate activators and/or aluminoxanes may be present at up to about 500 ppm, at about 1 to about 300 ppm, at 10 to about 300 ppm, or at about 10 to about 100 ppm. Carrier streams that may be used include isopentane and or hexane, among others. The carrier may be added to the mixture of the slurry and the solution, typically at a rate of about 0.5 to about 60 lbs/hr (27 kg/hr). Likewise, a carrier gas 114, such as nitrogen, argon, ethane, propane, and the like, may be added in-line to the mixture of the slurry and the solution. Typically, the carrier gas may be added at the rate of about 1 to about 100 lb/hr (0.4 to 45 kg/hr), or about 1 to about 50 lb/hr (5 to 23 kg/hr), or about 1 to about 25 lb/hr (0.4 to 11 kg/hr).

In another embodiment, a liquid carrier stream is introduced into the combination of the solution and slurry that is moving in a downward direction. The mixture of the solution, the slurry and the liquid carrier stream may pass through a mixer or length of tube for mixing before being contacted with a gaseous carrier stream.

Similarly, a comonomer 116, such as hexene, another alpha-olefin, or diolefin, may be added in-line to the mixture of the slurry and the solution. The slurry/solution mixture is then passed through an injection tube 120 to a reactor 122. In some embodiments, the injection tube may aerosolize the slurry/solution mixture. Any number of suitable tubing sizes and configurations may be used to aerosolize and/or inject the slurry/solution mixture.

In one embodiment, a gas stream 126, such as cycle gas, or re-cycle gas 124, monomer, nitrogen, or other materials is introduced into a support tube 128 that surrounds the injection tube 120. To assist in proper formation of particles in the reactor 122, a nucleating agent 118, such as fumed silica, can be added directly into the reactor 122.

When a metallocene catalyst or other similar catalyst is used in the gas phase reactor, oxygen or fluorobenzene can be added to the reactor 122 directly or to the gas stream 126 to control the polymerization rate. Thus, when the zirconocene catalyst of Formula I (which is sensitive to oxygen or fluorobenzene) is used in combination with another catalyst (that is not sensitive to oxygen) in a gas phase reactor, oxygen can be used to modify the zirconocene polymerization rate relative to the polymerization rate of the other catalyst. The addition of water or carbon dioxide to gas phase polymerization reactors, for example, may be applicable for similar purposes. In one embodiment, the contact temperature of the slurry and the solution is in the range of from 0° C. to about 80° C., from about 0° C. to about 60° C., from about 10° C., to about 50° C., and from about 20° C. to about 40° C.

The example above is not limiting, as additional solutions and slurries may be included. For example, a slurry can be combined with two or more solutions having the same or different catalyst compounds and or activators. Likewise, the solution may be combined with two or more slurries each having the same or different supports, and the same or different catalyst compounds and or activators. Similarly, two or more slurries combined with two or more solutions, preferably in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, are each independently combined, in-line, with the slurry.

Use of Catalyst Composition to Control Product Properties

As described in embodiments herein, appropriate selection of the catalysts and ratios may be used to adjust the MWD, short chain branch distribution (SCBD), and long-chain branch distribution (LCBD) of the polymer, for example, to provide a polymer with a broad orthogonal composition distribution (BOCD). The MWD, SCBD, and LCBDs would be controlled by combining catalysts with the appropriate weight average molecular weight (Mw), comonomer incorporation, and long chain branching (LCB) formation under the conditions of the polymerization. For instance, in various embodiments the weight average molecular weight of the low molecular weight polyethylene component can be from 5,000 to 35,000 grams/mole (g/mol) and/or the weight average molecular weight of the high molecular weight polyethylene component is from 400,000 to 700,000 g/mol. However, other values are possible depending upon an intended application, etc.

Employing multiple pre-catalysts that are co-supported on a single support mixed with an activator, such as a silica methylaluminoxane (SMAO), can provide a cost advantage by making the product in one reactor instead of multiple reactors. Further, using a single support also facilitates intimate mixing of the polymers and offers improved operability relative to preparing a mixture of polymers of different Mw and density independently from multiple catalysts in a single reactor. As used herein, a pre-catalyst is a catalyst compound prior to exposure to activator.

The density of a polyethylene copolymer provides an indication of the incorporation of comonomer into a polymer, with lower densities indicating higher incorporation. The expected difference in the densities of the low molecular weight (LMW) component and the high molecular weight (HMW) component can be greater than about 0.02, or greater than about 0.04, with the HMW component having a lower density than the LMW component. These factors can be adjusted by controlling the molecular weight distribution (MWD) and SCBD, which, in turn, can be adjusted by changing the relative amount of the two pre-catalysts on the support. This may be adjusted during the formation of the pre-catalysts, for example, by supporting two catalysts on a single support. In some embodiments, the relative amounts of the pre-catalysts can be adjusted by adding one of the components to a catalyst mixture such as a bimodal polymerization catalyst system en-route to the reactor in a process termed "trim". Feedback of polymer property data can be used to control the amount of catalyst addition. Metallocenes (MCNs) such as zirconocenes are known to trim well with other catalysts.

The properties of the product polymer may be controlled by adjusting the timing, temperature, concentrations, and sequence of the mixing of the solution, the slurry and any optional added materials (nucleating agents, catalyst compounds, activators, etc.) described above. The MWD, melt index, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, changing the amount of the second catalyst in the polymerization system. Other process parameters that can be adjusted include changing the relative ratio of the catalyst in the polymerization process (and optionally adjusting their individual feed rates to maintain a steady or constant polymer production rate). The concentrations of reactants in the reactor 122 can be adjusted by changing the amount of liquid or gas that is withdrawn or purged from the process, changing the amount and/or composition of a recovered liquid and/or recovered gas returned to the polymerization process, where the recovered liquid or recovered gas can be recovered from polymer discharged from the polymerization process. Further concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted, such as changing the relative feed rates of the slurry or solution, changing the mixing time, the temperature and or degree of mixing of the slurry and the solution in-line, adding different types of activator compounds to the polymerization process, and adding oxygen or fluorobenzene or other catalyst poison to the polymerization process. Any combinations of these adjustments may be used to control the properties of the final polymer product.

In one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In one embodiment, a polymer product property is measured in-line and in response the ratio of the catalysts being combined is altered. In one embodiment, the molar ratio of the catalyst compound in the catalyst component slurry to the catalyst compound in the catalyst component solution, after the slurry and solution have been mixed to form the final catalyst composition, is 500:1 to 1:500, or 100:1 to 1:100, or 50:1 to 1:50 or 40:1 to 1:10. In another embodiment, the molar ratio of a non-metallocene catalyst compound in the slurry to a zirconocene catalyst compound in the solution, after the slurry and solution have been mixed to form the catalyst composition, is 500:1, 100:1, 50:1, 10:1, or 5:1. In another embodiment, when the ratio of the catalyst compounds is altered, the introduction rate of the catalyst composition to the reactor, or other process parameters, is altered to maintain a desired production rate.

Polymerization Process

The polymerization catalysts of Formula I and bimodal polymerization catalyst systems including the polymerization catalyst of Formula I can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 1 can be used. For example, a trim system may be used to feed catalyst to a loop slurry reactor for polyethylene copolymer production.

The terms "polyethylene" and "polyethylene copolymer" refer to a polymer having at least 50 wt. % ethylene-derived units. In various embodiments, the polyethylene can have at least 70 wt. % ethylene-derived units, at least 80 wt. % ethylene-derived units, at least 90 wt. % ethylene-derived units, or at least 95 wt. % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 1, the fluidized bed reactor 122 can include a reaction zone 132 and a velocity reduction zone 134. The reaction zone 132 can include a bed 136 that includes growing polymer particles, formed polymer particles and a minor amount of catalyst particles fluidized by the continuous flow of the gaseous monomer and diluent to remove heat of polymerization through the reaction zone. Optionally, some of the re-circulated gases 124 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 132 can be passed to the velocity reduction zone 134 where entrained particles are removed, for example, by slowing and falling back to the reaction zone 132. If desired, finer entrained particles and dust can be removed in a separation system such as a cyclone and/or fines filter. The gas 124 can be passed through a heat exchanger 140 where at least a portion of the heat of polymerization can be removed. The gas can then be compressed in a compressor 142 and returned to the reaction zone 132. Additional reactor details and means for operating the reactor 122 are applicable.

The reactor temperature of the fluid bed process can be greater than about 30° C., about 40° C., about 50° C., about 90° C., about 100° C., about 110° C., about 120° C., about 150° C., or higher. In general, the reactor temperature is operated at the highest feasible temperature taking into account the sintering temperature of the polymer product within the reactor. Thus, the upper temperature limit in one embodiment is the melting temperature of the polyethylene copolymer produced in the reactor. However, higher temperatures may result in narrower MWDs, which can be improved by the addition of other co-catalysts, as described herein.

Hydrogen gas can be used in olefin polymerization to control the final properties of the polyolefin, such as described in the "Polypropylene Handbook," at pages 76-78 (Hanser Publishers, 1996). Using certain catalyst systems, increasing concentrations (partial pressures) of hydrogen can increase the flow index (FI), or melt index (MI) of the polyethylene copolymer generated. The flow index can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be an amount necessary to achieve the desired flow index of the final polyolefin polymer. For example, the mole ratio of hydrogen to total monomer (H2:monomer) can be greater than about 0.0001, greater than about 0.0005, or greater than about 0.001. Further, the mole ratio of hydrogen to total monomer (H2:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 5,000 ppm, up to about 4,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppm, or about 100 ppm to a high of about 400 ppm, about 800 ppm, about 1,000 ppm, about 1,500 ppm, or about 2,000 ppm, based on weight. Further, the ratio of hydrogen to total monomer (H2:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 45,500 kg/hr (100,000 lbs/hr).

As noted, a slurry polymerization process can also be used in embodiments. A slurry polymerization process generally uses pressures in the range of from about 101 kPa (1 atmosphere) to about 5,070 kPa (50 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed. The slurry can be circulated in a continuous loop system.

A number of tests can be used to compare resins from different sources, catalyst systems, and manufacturers. Results of tests run on resins made in embodiments described herein are presented in the examples section.

As used herein, BBF is Butyl Branching Frequency, number of butyl branches per 1000 main chain carbon atoms. BBF is determined by the following method. The samples are prepared by adding approximately 2.74 g of a 50/50 mixture of tetrachloroethane-$d_2$/orthodichlorobenzene containing 0.025 M Cr(AcAc)$_3$ to 0.15 g of polymer in a Norell 1001-7 10 mm NMR tube. Oxygen is removed by manually purging tubes with nitrogen using a Pasteur pipette for 1 minute. The samples are dissolved and homogenized by heating the tube and its contents to ~150° C. using a heating block. Each sample is visually inspected to ensure homogeneity. Samples are thoroughly mixed immediately prior to analysis, and are not allowed to cool before insertion into the heated NMR probe.

The NMR data are collected using a Bruker 400 MHz spectrometer, optionally equipped with a Bruker CryoProbe. Samples are allowed to thermally equilibrate at the probe temperature of 120° C. for seven minutes prior to data acquisition. The data are acquired using 320 transient scans, and a six second pulse repetition delay. All measurements are made on non-spinning samples in locked mode. The $^{13}$C NMR chemical shifts are internally referenced to the EEE triad at 30 ppm.

Short chain branches (SCB) from hexene (C4 branches) comonomer are determined by setting the integral value for the entire spectrum (from ~40 to 10 ppm) to 1000, and then BBF is calculated according to the following formula.

$$BBF=(a+b/2+c+d/2+e)/5,$$

where a, b, c, d, e and f are the integrated regions of the signals at 38.2, 34.6, 34.2, 27.3 and 23.4 ppm, respectively.

As used herein, Mn is number average molecular weight, Mw is weight average molecular weight, and Mz is z average molecular weight, wt % is weight percent, and mol % is mole percent.

Mw, Mn, Mz, and Mw/Mn are determined by using a High Temperature Gel Permeation Chromatography (Polymer Laboratories), equipped with a differential refractive index detector (DRI). Three Polymer Laboratories PLgel 10 µm Mixed-B columns are used. The nominal flow rate is 1.0 mL/min, and the nominal injection volume is 300 µL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation:

$$\log M_X = \frac{\log(K_X/K_{PS})}{a_X+1} + \frac{a_{PS}+1}{a_X+1} \log M_{PS}$$

where the variables with subscript "X" stand for the test sample while those with subscript "PS" stand for PS. In this method, $a_{PS}$=0.67 and $K_{PS}$=0.000175 while $a_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for polyethylene.

The mass recovery is calculated from the ratio of the integrated area of the concentration chromatography over elution volume and the injection mass which is equal to the pre-determined concentration multiplied by injection loop volume.

All molecular weights are reported in g/mol unless otherwise noted. In event of conflict between the GPC-DRI procedure and the "Rapid GPC," the GPC-DRI procedure immediately above shall be used. Further details regarding methods of determining Mw, Mn, Mz, MWD are described in US 2006/0173123 page 24-25, paragraphs [0334] to [0341].

Polymerization Activity i.e., activity (grams polymer/gram catalyst-hour) can be determined as a ratio of an amount of polymer produced to an amount of catalyst added to the reactor.

Melt temperature can be determined via Differential Scanning calorimetry according to ASTM D 3418-08. For instance, using a scan rate of 10° C./min on a sample of 10 mg and using the second heating cycle.

Comonomer content (i.e., 1-hexene) incorporated in the polymers (weight %)) can be determined by rapid FT-IR spectroscopy on the dissolved polymer in a GPC measurement. For instance, comonomer content can be determined with respect to polymer molecular weight by use of an infrared detector such as an IR5 detector in a gel permeation chromatography measurement, as described in Analytical Chemistry 2014, 86(17), 8649-8656. "Toward Absolute Chemical Composition Distribution Measurement of Polyolefins by High-Temperature Liquid Chromatography Hyphenated with Infrared Absorbance and Light Scattering Detectors" by Dean Lee, Colin Li Pi Shan, David M. Meunier, John W. Lyons, Rongjuan Cong, and A. Willem deGroot. Analytical Chemistry 2014 86 (17), 8649-8656.

Density can be determined in accordance with ASTM D-792. Density is expressed as grams per cubic centimeter (g/cm3) unless otherwise noted. The polyethylene can have a density ranging from a low of about 0.89 g/cm3, about 0.90 g/cm3, or about 0.91 g/cm3 to a high of about 0.95 g/cm3, about 0.96 g/cm3, or about 0.97 g/cm3. The polyethylene can have a bulk density, measured in accordance with ASTM D1895 method B, of from about 0.25 g/cm3 to about 0.5 g/cm3. For example, the bulk density of the polyethylene can range from a low of about 0.30 g/cm3, about 0.32 g/cm3, or about 0.33 g/cm3 to a high of about 0.40 g/cm3, about 0.44 g/cm3, or about 0.48 g/cm3. In some embodiments, the bimodal polyethylene composition can have a density of 0.940 gram/cubic centimeters or more.

The polyethylene (e.g., a HDPE) can be suitable for such articles as films, fibers, nonwoven and/or woven fabrics, extruded articles, and/or molded articles. Examples of films include blown or cast films formed in single layer extrusion, coextrusion, or lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions by injection molding or rotation molding or blow molding processes in the form of bottles, tanks, large hollow articles, rigid food containers and toys, etc.

All numerical values are "about" or "approximately" the indicated value, and take into account experimental error and variations that would be expected by a person having ordinary skill in the art. Further, various terms have been defined above. To the extent a term used in a claim is not defined above, it should be given the broadest definition persons in the pertinent art have given that term as reflected in at least one printed publication or issued patent. All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

EXAMPLES

Sample Catalyst Preparation of unimodal and bimodal catalyst systems. Preparation of Spray Dried Polymerization Catalysts:

A polymerization catalyst system is prepared by slurrying 1.6 kg of treated fumed silica (Cabosil TS-610) in 16.8 kg of toluene, followed by addition of a 10% solution (11.6 kg) by weight of MAO in toluene. The resulting mixture is introduced into an atomizing device, producing droplets that are then contacted with a hot nitrogen gas stream to evaporate the liquid and form a powder. The powder is separated from the gas mixture in a cyclone separator and discharged into a container. The spray drier temperature is set at 160° C. and the outlet temperature at 70-80° C. The product collected is a fine powder. The spray dried product of Example 1 is then used as a polymerization catalyst using the equipment and under conditions described herein, by contacting it with a solution of a catalyst component prepared as described in the following examples.

The unimodal polymerization catalyst system used in the Examples 1-4 summarized in Table 4 below were made by a process identical to or similar to the following sample catalyst preparation process below.

Polymerization Process for Working Examples 1-4 and Comparative Examples 1-4.

In the Working Examples 1-4 and Comparative Examples 1-4 summarized in Table 1, a gas phase fluidized bed reactor having a 304.8 mm (twelve inch) internal diameter and a 2.4384 meter (8 feet) in straight-side height was utilized. The fluidized bed was polymer granules, and the gaseous feed streams of ethylene and hydrogen together with liquid 1-hexene comonomer introduced below the reactor bed into the recycle gas line. The individual flow rates of ethylene, hydrogen and 1-hexene were controlled to maintain a fixed composition ratio of C6/C2=0.0050. The ethylene concentration was controlled to maintain a constant ethylene partial pressure. The hydrogen was controlled to maintain constant hydrogen to ethylene mole ratio of 0.0020. The concentrations of all the gases were measured by an on-line gas chromatograph to ensure relatively constant composition in the recycle gas stream. The reacting bed of growing polymer particles was maintained in a fluidized state by the continuous flow of the make-up feed and recycle gas through the reaction zone. A superficial gas velocity of 0.48768-0.67056 m/sec (1.6-2.2 ft/sec) was used. The reactor was operated at a total pressure of ~2344.22-2413.17 kPA (~340-350 psig). The reactor was operated at a constant reaction temperature of 105° C. The fluidized bed was maintained at a constant height by withdrawing a portion of the bed at a rate equal to the rate of formation of particulate product. The polymer production rate was in the range of ~13.61-18.14 kg/hour (30-40 lb/hour). The product was removed semi-continuously via a series of valves into a fixed volume chamber. This product was purged to remove entrained hydrocarbons and treated with a small stream of humidified nitrogen to deactivate any trace quantities of residual catalyst.

Working Example 1 (WE 1): A Metallocene Compound Representative of Formula II is Prepared by the Following Procedure Indene (15.0 mL) is dissolved in hexane (200 mL) and n-butyllithium (88.4 mL, 1.6M in hexanes) is added slowly. After stirring overnight, the white precipitate is collected by filtration, washed with hexane, and dried in vacuo to yield 15.25 g of indenyllithium.

Indenyllithium (6.64 g) is slurried in ether (70 mL) and cooled to −40° C. Iodomethane (4.1 mL) is added, and the reaction stirred overnight as it warms to room temperature. Volatiles are removed in vacuo, and hexane (100 mL) is added to the residue. After filtering, n-butyllithium (35.7 mL, 1.6M in hexanes) is added to the filtrate and the mixture stirred overnight as a white precipitate develops. The white solid is collected by filtration, washed with hexane, and dried to yield 4.932 g of 1-methylindenyllithium.

1-Methylindenyllithium (2.40 g) is dissolved in THF (40 mL) and cooled to −40° C. Methyl iodide (1.40 mL) is added slowly, and the reaction mixture is allowed to warm to room temperature and continue reacting overnight. Volatiles are removed in vacuo, and ether (100 mL) and water (100 mL) are added. The organic layer is separated, washed with brine (50 mL), dried over $MgSO_4$ and filtered. Removal of volatiles in vacuo yields 2.255 g of a mixture comprising about 93 mol % 1,3-dimethylindene, and about 7 mol % 3,3-dimethylindene.

The dimethylindene mixture (2.25 g) is dissolved in hexane (40 mL), n-butyllithium (10.8 mL, 1.6M in hexane) is added, and the reaction mixture stirred for several days. A white solid is collected by filtration, washed with hexane, and dried in vacuo to yield 1.961 g of 1,3-dimethylindenyllithium.

1,3-Dimethylindenyllithium (17.18 g) and $(PrCp)ZrCl_3$ (dme) (45.19 g) are combined in ether (350 mL) and stirred overnight. Solvents are removed in vacuo to yield a solid. After extracting into dichloromethane (300 mL) and filtering, solvents are removed from the filtrate in vacuo to yield a bright yellow solid that is recrystallized from dichloromethane/hexane to yield 30.9 g of $(PrCp)(1,3-Me_2Ind)ZrCl_2$.

In a Parr pressure vessel, $(PrCp)(1,3-Me_2Ind)ZrCl_2$ (8.87 g) is dissolved in dichloromethane (150 mL) and $PtO_2$ (0.049 g) is added. The vessel is pressurized to 55 psig with hydrogen, and stirred overnight. The reaction mixture is vented, and the mixture is filtered. Removal of solvents in vacuo from the filtrate yields 7.83 g of $(PrCp)(1,3-Me_2-H_4-Ind)ZrCl_2$ as a white solid.

The $(PrCp)(1,3-Me_2-H_4-Ind)ZrCl_2$ (7.83 g) is slurried in ether (175 mL), and MeMgBr (12.47 mL, 1.6M in hexane) is added over about 20 min. After stirring overnight, solvents are removed from the reaction in vacuo and hexane (150 mL) is added. The mixture is filtered, and the filtrate evaporated to dryness. Yield=6.58 g of $(PrCp)(1,3-Me_2-H_4-Ind)ZrMe_2$.

Working Example 2 (WE 2): A Metallocene Compound Representative of Formula III is Prepared by the Following Procedure 1,3-Dimethylindenyllithium is prepared as described in Working Example 1. 1,3-Dimethylindenyllithium (1.948 g) and $(MeCp)ZrCl_3(dme)$ (4.760 g) are combined in ether (90 mL) and stirred for 2.5 hr. Solvents are removed in vacuo to yield a bright yellow solid. After extracting into dichloromethane (150 mL) and filtering, solvents removed from the filtrate in vacuo to yield 4.660 g of $(MeCp)(1,3-Me_2Ind)ZrCl_2$.

In a Fisher-Porter tube, $(MeCp)(1,3-Me_2Ind)ZrCl_2$ is dissolved in dichloromethane (15 mL) and $PtO_2$ (0.028 g) is added. The tube is pressurized to 55 psig with hydrogen, and stirred using magnetic stirring overnight. The reaction mixture is vented, and volatiles are removed by evaporation. The product is extracted with toluene (35 mL) and dichloromethane (20 mL), filtered, and dried in vacuo. Yield=1.155 g of $(MeCp)(1,3-Me_2-H_4-Ind)ZrCl_2$.

The metallocene (4.199 g) is slurried in ether (100 mL), and MeMgBr (7.21 mL, 1.6M in hexane) is added. After stirring overnight, solvents are removed from the reaction mixture in vacuo and hexane (150 mL) is added. The mixture is filtered, and the filtrate evaporated to dryness. Yield=3.24 g of $(MeCp)(1,3-Me_2-H_4-Ind)ZrMe_2$. The solid is dissolved in hexane (ca 300 mL), and filtered into a transport vessel to form a solution containing 0.95 weight percent of the metallocene.

Working Example 3 (WE 3): A Metallocene Compound Representative of Formula IV is Prepared by the Following Procedure 1,3-Dimethylindenyllithium is prepared as described in Working Example 1. To a stirred suspension of (Cp)ZrCl$_3$ (5.16 g, 19.6 mmol) in dimethoxyethane (90 mL) is added 1,3-dimethylindenyllithium (2.95 g, 19.6 mmol). The reaction mixture is stirred overnight at room temperature. The resulting reaction mixture is held in vacuo to remove solvents. The resulting solid is extracted several times with dichloromethane (250 mL) and filtered to obtain a beige solid and a yellow solution. Volatile components are removed from the yellow filtrate in vacuo to yield a crude product, which is recrystallized employing dichloromethane/hexanes to afford 3.8 g of (1,3-Me$_2$-Ind)(Cp)ZrCl$_2$ as a yellow solid.

To a solution of (1,3-Me$_2$-Ind)(Cp)ZrCl$_2$ (6.84 g, 18.5 mmol) in dichloromethane (280 mL) is added PtO$_2$ (0.21 g, 3 wt %). The resulting mixture is pressurized in a Parr reactor with 80 psi H$_2$ for 18 hours. After removing from the Parr reactor, the reaction mixture is filtered. Volatiles are removed in vacuo from the filtrate to give 4.6 g of a beige-white solid product of (1,3-Me$_2$-H$_4$-Ind)(Cp)ZrCl$_2$.

To a stirred suspension of (1,3-Me$_2$-H$_4$-Ind)(Cp)ZrCl$_2$ (4.6 g, 12.2 mmol) in diethyl ether (75 mL) is added a solution of methyl magnesium bromide (3.0 M, 10.2 mL, 30.5 mmol) over 15 minutes. The reaction mixture is stirred overnight at room temperature. The solvent is removed under vacuum. The resulting white-beige solid is taken up in 150 mL of hexanes, stirred and filtered to give a white solid and a light amber liquid. The filtrate is held under vacuum to remove the remaining solvent and afford 3.7 g of a waxy solid product of (1,3-Me$_2$-H$_4$-Ind)(Cp)ZrMe$_2$. The product (1,3-Me$_2$-H$_4$-Ind)(Cp)ZrMe$_2$ is dissolved in hexane (538 mL), and filtered into a transport vessel to form a solution containing 1.04 weight percent of the metallocene.

Working Example 4 (WE 4): A Metallocene Compound Representative of Formula V is Prepared by the Following Procedure 1-Methylindenyllithium is prepared as described in Working Example 1. 1-Methylindenyllithium (3.600 g) is slurried in ether (50 mL) and 1-bromopropane (3.12 mL) is added slowly. After stirring for several hours, solvents are removed at reduced pressure. The residue is treated with ether (100 mL) and water (50 mL). The organic layer is separated, washed with water (50 mL) and brine (30 mL), then dried over magnesium sulfate, filtered and evaporated to yield a mixture of approximately 68% 1-methyl-3-propylindene, and 32% 3-methyl-3-propylindene. The indene mixture is dissolved in hexane (70 mL) and n-butyllithium (11.9 mL, 1.6M in hexanes) is added. The mixture is stirred overnight as an off-white solid precipitates. The solid is collected by filtration and washed thoroughly with hexane, then dried in vacuo to yield 2.117 g of 1-propyl-3-methylindenyllithium.

1-Propyl-3-methylindenyllithium (2.117 g) and CpZrCl$_3$ (3.120 g) are combined in ether (120 mL) and stirred overnight. The ether is removed in vacuo, toluene (60 mL) is added, the mixture is filtered, and solvents removed in vacuo from the filtrate to yield 4.260 g of (Cp)(1-Pr-3-Me-Ind)ZrCl$_2$ as a bright yellow solid.

In a Fisher-Porter tube, the (Cp)(1-Pr-3-Me-Ind)ZrCl$_2$ (1.42 g) is dissolved in dichloromethane (20 mL) and PtO$_2$ (0.016 g) is added. The tube is pressurized to 70 psig with hydrogen gas, and stirred using magnetic stirring overnight. Two additional Fisher-Porter tubes are identically prepared. The reaction mixtures are vented and combined, and volatiles are removed by evaporation. The combined products are extracted into CH$_2$Cl$_2$ (50 mL), filtered and solvents removed from the filtrate in vacuo to yield 4.031 g of (Cp)(1-Pr-3-Me-H$_4$-Ind)ZrCl$_2$ as a white solid. After recrystallizing from a mixture of hexane (45 mL) and dichloromethane (5 mL), 3.120 g of white needles are collected.

The metallocene dichloride (Cp)(1-Pr-3-Me-H$_4$-Ind)ZrCl$_2$ (3.11 g) is slurried in ether (50 mL), and methylmagnesium bromide (5.2 mL, 3.0 M in ether) is added. After stirring for 90 min at room temperature, ether is removed in vacuo. Hexane is added, the mixture is filtered, and solvents are removed from the filtrate in vacuo to yield 2.573 g of (Cp)(1-Pr-3-Me-H$_4$-Ind)ZrMe$_2$. The solid is dissolved in hexane (380 mL), and filtered into a transport vessel to form a solution containing 0.99 weight percent of the metallocene.

Comparative Example 1 (CE 1): A Metallocene Compound Representative of Formula VI is Prepared by the Following Procedure 1-Methylindenyllithium is prepared as described in Working Example 1. 1-Methylindenyllithium (6.00 g) and (MeCp)ZrCl$_3$(dme) (12.197 g) are combined in DME (50 mL) and stirred overnight. Solvents are removed in vacuo to yield a bright yellow solid. After extracting into dichloromethane (200 mL) and filtering, solvents are removed from the filtrate in vacuo to yield a solid product, which is recrystallized from toluene/hexane to afford 12.33 g of (MeCp)(1-Me-Ind)ZrCl$_2$.

In a Parr pressure vessel with a glass insert, (MeCp)(1-MeInd)ZrCl$_2$ (7.89 g) is dissolved in dichloromethane (200 mL) and PtO$_2$ (0.242 g) is added. The vessel is pressurized to 65 psig with hydrogen, and stirred overnight. The product is filtered and concentrated in vacuo to yield 7.08 g of (MeCp)(1-Me-H$_4$-Ind)ZrCl$_2$.

(MeCp)(1-Me-H$_4$-Ind)ZrCl$_2$ (7.079 g) is slurried in ether (140 mL), and methylmagnesium bromide (15.75 mL, 1.6M in hexane) is added. After stirring overnight, solvents are removed from the reaction in vacuo and hexane (100 mL) is added. The mixture is filtered, and the filtrate evaporated to dryness to obtain 5.95 g of (MeCp)(1-Me-H$_4$-Ind)ZrMe$_2$. The solid is dissolved in hexane (ca 900 mL), and filtered into a transport vessel to form a solution containing 1.08 weight percent of the metallocene.

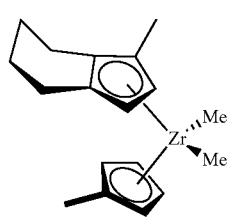

(Formula VI)

Comparative Example 2 (CE 2): A Metallocene Compound Representative of Formula VII is Purchased from Boulder Scientific Company

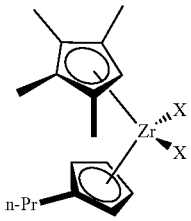

(Formula VII)

Comparative Example 3 (CE 3): A Metallocene Compound Representative of Formula VIII is Prepared by the Following Procedure 2-Methylindene (2.43 g) is dissolved in hexanes (50 mL), and n-butyllithium (12.8 mL, 1.6 M in hexanes) is added slowly at room temperature. The reaction is allowed to stir at room temperature for five hours, and the resultant white precipitate is collected by vacuum filtration, washed with hexanes, and dried under vacuum to yield 2.50 g of 2-methylindenyllithium as a white solid.

2-Methylindenyllithium (0.700 g) is dissolved in diethyl ether (25 mL) in a 50 mL glass bottle equipped with a stir bar. The bottle is capped with a rubber septum, brought out of the glovebox, and a nitrogen inlet added. The reaction mixture is cooled in an ice bath, and 1-iodopropane (1.75 g) is added via syringe. The reaction mixture is allowed to warm to room temperature over one hour, and then quenched with saturated aqueous ammonium chloride solution, and the layers are separated. The organic fraction is dried over magnesium sulfate, filtered, and concentrated to give 1-propyl-2-methylindene as a pale yellow oil (0.779 g).

1-Propyl-2-methylindene (0.770 g) is dissolved in hexanes (15 mL) and n-butyllithium (3.1 mL, 1.6 M in hexanes) is added slowly at room temperature. The reaction is allowed to stir at room temperature for six days, and the resultant white precipitate is collected by vacuum filtration, washed with hexanes, and dried under vacuum to yield 1-propyl-2-methylindenyllithium as a white solid (0.715 g).

1-Propyl-2-methylindenyllithium (0.678 g) is dissolved in ether (25 mL) and CpZrCl$_3$ (1.00 g) is added, resulting in immediate formation of a yellow solution and precipitate. The mixture is stirred for three days and then filtered and the filtrate concentrated under vacuum. The resultant yellow solids are recrystallized from dichloromethane at room temperature by slow mixing of a hexanes layer. The crystals are collected, washed with hexanes, and dried under vacuum to give (Cp)(1-Pr-2-Me-Ind)ZrCl$_2$ as a bright yellow solid (1.08 g).

In a Fisher-Porter tube, (Cp)(1-Pr-2-Me-Ind)ZrCl$_2$ (2.50 g) is dissolved in dichloromethane (20 mL) and PtO$_2$ (0.071 g) is added. The tube is pressurized to 70 psig with hydrogen, and stirred using magnetic stirring for three days. Two additional reactions are prepared and executed in the same way. The vessels are vented and volatiles evaporated. The combined products are extracted with dichloromethane (45 mL), filtered and the volume reduced in vacuo to about 25 mL. Hexane (35 mL) is added and recrystallization conducted at −35° C. to yield 3.854 g of (Cp)(1-Pr-2-Me-H$_4$-Ind)ZrCl$_2$.

The (Cp)(1-Pr-2-Me-H$_4$-Ind)ZrCl$_2$ (3.840 g) is slurried in ether (50 mL), and methylmagnesium bromide (6.4 mL, 1.6M in hexane) is added, and the reaction mixture stirred overnight. Ether is removed in vacuo, and hexane (50 mL) added, the mixture filtered, and the filtrate evaporated to dryness to yield 3.291 g of (Cp)(1-Pr-2-Me-H$_4$-Ind)ZrMe$_2$. The solid is dissolved in hexane (ca 450 mL), and filtered into a transport vessel to form a solution containing 1.10 weight percent of the metallocene.

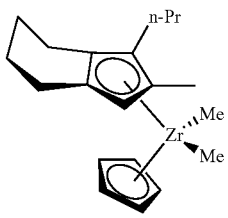

(Formula VIII)

Comparative Example 4 (CE 4): A Metallocene Compound Representative of Formula IX is Prepared by the Following Procedure Indenyllithium is prepared as described in Working Example 1. Indenyllithium (2.00 g) is slurried in ether (20 mL) and iodoethane (1.44 mL) is added slowly. After stirring for several hours, the mixture is treated with water (20 mL). The organic layer is separated, washed with water (10 mL), brine (10 mL), dried over magnesium sulfate, filtered and evaporated to yield 2.17 g of 1-ethylindene.

1-Ethylindene is dissolved in hexane (40 mL) and n-butyllithium (10.3 mL, 1.6M in hexanes) is added, and the mixture stirred overnight as a white solid precipitates. The product is collected by filtration, washed thoroughly with hexane, and dried in vacuo. Yield=1.956 g (86.6%) of 1-ethylindenyllithium.

1-Ethylindenyllithium (1.930 g) and (PrCp)ZrCl$_3$(dme) (5.077 g) are combined in ether (90 mL) and stirred overnight. Solvents are removed in vacuo to yield a bright yellow solid. After extracting into dichloromethane (50 mL) and filtering, solvents removed from the filtrate in vacuo to yield 5.316 g of (PrCp)(1-EtInd)ZrCl$_2$.

In a Fisher-Porter tube, (PrCp)(1-EtInd)ZrCl$_2$ (1.772 g) is dissolved in dichloromethane (20 mL) and PtO$_2$ (0.080 g) is added. Two additional identical reactions are prepared and carried out. The tubes are pressurized to 70 psig with hydrogen, and stirred using magnetic stirring overnight. The reaction mixtures are vented, and volatiles are removed by evaporation. The combined products are extracted with dichloromethane (150 mL), filtered and reduced in vacuo to 12 mL. Hexane (45 mL) is added and the product recrystallized from this solvent mixture at reduced temperature to yield 3.867 g of (PrCp)(1-Et-H$_4$-Ind)ZrCl$_2$.

(PrCp)(1-Et-H$_4$-Ind)ZrCl$_2$ (3.850 g) is slurried in ether (80 mL), and methylmagnesium bromide (6.16 mL, 1.6M in hexane) is added. After stirring overnight, solvents are removed from the reaction in vacuo and hexane (50 mL) is added. The mixture is filtered, and the filtrate evaporated to dryness. Yield=3.154 g of (PrCp)(1-Et-H$_4$-Ind)ZrMe$_2$. The solid is dissolved in hexane (ca 450 mL), and filtered into a transport vessel to form a solution containing 1.03 weight percent of the metallocene.

TABLE 1

Data for Working Examples 1-4 and Comparative Examples 1-4.

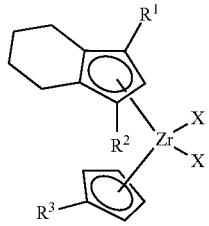

(Formula IX)

| Catalyst | BBF | Number average molecular weight Mn | Weight average molecular weight (Mw) | Z average molecular weight (Mz) | Mw/ (Mn) | Melt temperature (° C.) |
|---|---|---|---|---|---|---|
| WE 1 Formula II | 0.43 | 11,318 | 33,290 | 58,211 | 2.94 | 131.94 |
| WE 2 Formula III | 0.44 | 6,128 | 26,843 | 51,282 | 4.38 | 131.16 |
| WE 3 Formula IV | 0.5 | 13,651 | 37,323 | 66,262 | 2.73 | 132.42 |
| WE 4 Formula V | 0.72 | 9,410 | 29,103 | 51,901 | 3.09 | 131.66 |
| CE 1 Formula VI | 0.75 | 10,502 | 36,954 | 71,325 | 3.52 | 131.14 |
| CE2 Formula VII | 0.76 | 9,168 | 26,543 | 44,957 | 2.9 | 130.98 |
| CE 3 Formula VIII | 1.07 | 7,467 | 22,347 | 38,607 | 2.99 | 129.99 |
| CE 4 Formula IX | 1.08 | 6,657 | 24,139 | 45,736 | 3.63 | 130.06 |

As is shown in Table 1, WEs 1-4 have less butyl BBF (from 0.43 to 0.72) than the comparative examples CEs 1-4 (from 0.75 to 1.08). Thus, each of the WEs 1-4 have a desired degree of ethylene enchainment as evidenced by a corresponding lower BBF than each of the CEs 1-4. Without being bound to any theory, it is noted that the WEs 1-4 each are without a bulky cyclopentadienyl ring (i.e., those with a particular ring having branched/linear substituent groups attached to 3 or more carbons of the particular ring) and have a $R_2$ is an $C_1$ to $C_{20}$ alkyl, aryl or aralkyl group, in contrast to the CEs 1-4 that employ a bulky cyclopentadienyl ring and/or merely have a hydrogen at a position similar to the $R_2$ groups of the WE 1-4.

While the BBF of WE 1-4 are given for a particular catalyst of the Formula I (e.g., a catalyst of Formula II, Formula III, Formula III, and/or Formula IV) it is expected that the same desired degree of ethylene enchainment as evidenced by a lower degree of BBF is necessarily exhibited by bimodal polymers produced with from a bimodal polymerization catalyst system including a zirconocene catalyst of the Formula I.

What is claimed:

1. A polymerization catalyst having improved selectivity for ethylene enchainment, the polymerization catalyst comprising a zirconocene catalyst of Formula I:

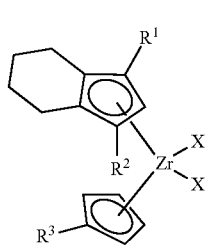

(Formula I)

wherein $R_1$ is a $C_1$ to $C_{20}$ alkyl, aryl or aralkyl group, wherein $R_2$ is an $C_1$ to $C_{20}$ alkyl, aryl or aralkyl group, and wherein $R_3$ is a $C_1$ to $C_{20}$ alkyl or a hydrogen, wherein each X is independently a halide, $C_1$ to $C_{20}$ alkyl, aralkyl group or hydrogen, and wherein $R_3$ is a C1 alkyl or a linear $C_3$ alkyl.

2. The polymerization catalyst of claim 1, wherein $R_2$ is a $C_1$ alkyl.

3. The polymerization catalyst of claim 2, wherein $R_1$ is a $C_1$ alkyl.

4. The polymerization catalyst of claim 1, wherein $R_1$ is a $C_3$ alkyl.

5. The polymerization catalyst of claim 1, wherein the polymerization catalyst of Formula I is included in a bimodal polymerization catalyst system further including a non-metallocene olefin polymerization catalyst.

6. A bimodal polyethylene composition having improved ethylene enchainment comprising a high molecular weight polyethylene component and a low molecular weight polyethylene component formed together in a single reactor via a bimodal polymerization catalyst system comprising:
a non-metallocene olefin polymerization catalyst; and
a zirconocene catalyst of the Formula I:

(Formula I)

wherein $R_1$ is a $C_1$ to $C_{20}$ alkyl, aryl or aralkyl group, wherein $R_2$ is an $C_1$ to $C_{20}$ alkyl, aryl or aralkyl group, and wherein $R_3$ is a $C_1$ to $C_{20}$ alkyl or a hydrogen, wherein each X is independently a halide, $C_1$ to $C_{20}$ alkyl, aralkyl group or hydrogen, and wherein $R_3$ is a C1 alkyl or a linear $C_3$ alkyl.

7. The bimodal polyethylene composition of claim 6, wherein the low molecular weight polyethylene has a butyl branching frequency of from 0.43 to 0.72.

8. A method of producing a bimodal polyethylene having improved ethylene enchainment, the method comprising:
polymerizing ethylene in a reactor in presence of a bimodal polymerization catalyst system to form the bimodal polyethylene, wherein the bimodal polymerization catalyst comprises:
a non-metallocene catalyst; and
a zirconocene catalyst of Formula I:

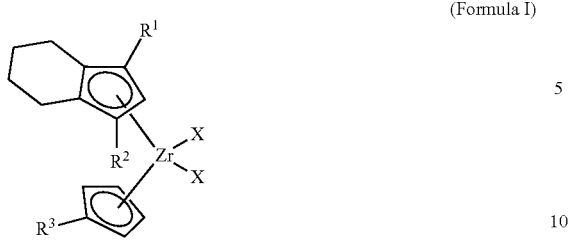
(Formula I)
wherein $R_1$ is a $C_1$ to $C_{20}$ alkyl, aryl or aralkyl group, wherein $R_2$ is an $C_1$ to $C_{20}$ alkyl, aryl or aralkyl group, and wherein $R_3$ is a $C_1$ to $C_{20}$ alkyl or a hydrogen, wherein each X is independently a halide, $C_1$ to $C_{20}$ alkyl, aralkyl or hydrogen, and wherein $R_3$ is a C1 alkyl or a linear $C_3$ alkyl.
* * * * *